US006616388B1

(12) United States Patent
Floe

(10) Patent No.: US 6,616,388 B1
(45) Date of Patent: Sep. 9, 2003

(54) TRAILER WITH VERSATILE TIE-DOWN STRUCTURE

(76) Inventor: Wayne G. Floe, HCR Box 131, McGregor, MN (US) 55760

(*) Notice: Subject to any disclaimer, the term of this patent is extended or adjusted under 35 U.S.C. 154(b) by 0 days.

(21) Appl. No.: 10/100,724

(22) Filed: Mar. 19, 2002

Related U.S. Application Data

(62) Division of application No. 08/978,781, filed on Nov. 26, 1997, now Pat. No. 6,439,814, which is a continuation of application No. 08/558,439, filed on Nov. 16, 1995, now abandoned.

(51) Int. Cl.$^7$ ................................................. B60P 7/08
(52) U.S. Cl. .................... 410/7; 410/3; 410/8; 410/11; 410/104
(58) Field of Search .............................. 410/2, 3, 7–11, 410/19, 23, 77, 104; 296/181, 182; 280/402; 248/500, 503; 414/485; 224/42.4

(56) References Cited

U.S. PATENT DOCUMENTS

| 2,052,914 A | * | 9/1936 | Williams ........................ 410/9 |
| 3,319,393 A | * | 5/1967 | Tantlinger et al. |
| 3,613,920 A | * | 10/1971 | Flamm ........................ 410/3 X |
| 3,972,500 A | * | 8/1976 | Johnson et al. ......... 410/104 X |
| 4,496,271 A | * | 1/1985 | Spinosa et al. ............. 410/105 |
| 5,137,403 A | * | 8/1992 | McCaffrey ................... 410/51 |
| 5,203,655 A | * | 4/1993 | Persau ........................... 410/3 |
| 6,439,814 B1 | * | 8/2002 | Floe .............................. 410/7 |

* cited by examiner

Primary Examiner—Stephen T. Gordon
(74) Attorney, Agent, or Firm—Charles A. Johnson

(57) ABSTRACT

An improved transport bed for use with trailers or the like and having improved clamp-down and tie-down structures is disclosed. A telescoping clamp-down device operable in conjunction with a retention channel mounted in the bed provides variably positioning capabilities of clamp-down. Slidable tie-down mechanisms can be utilized in the same retention track. Improved structural members for supporting and protecting the bed material are also disclosed.

17 Claims, 4 Drawing Sheets

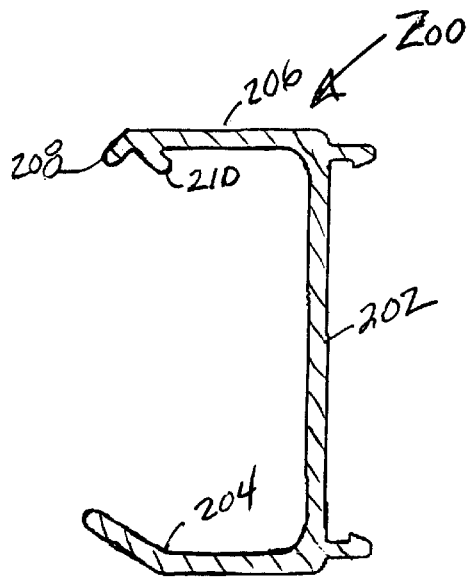
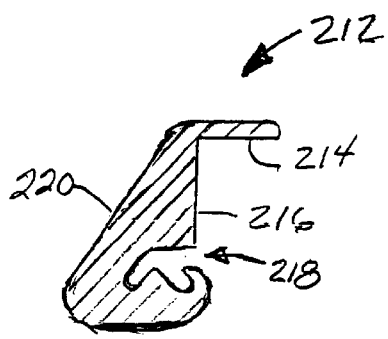
FIG. 10
FIG. 11
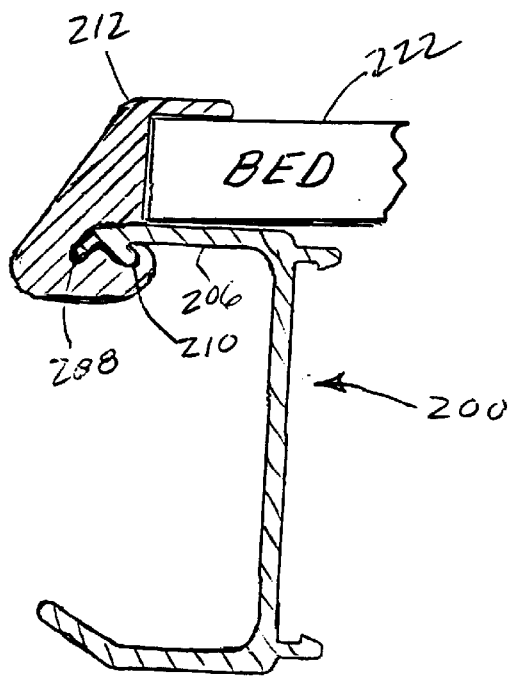
FIG. 12

TRAILER WITH VERSATILE TIE-DOWN STRUCTURE

This application is a Divisional application of a third Continuation of application, Ser. No. 08/978,781, filed Nov. 26, 1997 now U.S. Pat. No. 6,439,814B1, which was a Continuation of application Ser. No. 08/558,439, filed Nov. 16, 1995, now abandoned.

BACKGROUND OF THE INVENTION

1. Field of the Invention

This invention relates generally to bed structures for hauling; and more particularly, to a light-weight structure having improved clamp-down and tie-down mechanisms adjustably positioned thereon.

2. State of the Prior Art

Various structures for supporting and transporting snowmobiles, all terrain vehicles, garden tractors, motorcycles, and the like have been described. Many of these structures are associated with trailers that can be towed behind a vehicle. Many general hauling structures included fixed tie-down devices around the periphery of the bed that are utilized in conjunction with chains, ropes, elastic style hooked tie-down devices, or retractable web tie-down material. Tying objects or various types of recreational vehicles in this manner is time consuming, inconvenient, and in many instances unsafe and inadequate.

Various types of specialty tie-down and clamp-down devices have been developed to be utilized in conjunction with specific objects. For example, various types of snowmobile trailers have bar structures that can be affixed across the tops of the snowmobile skis and are affixed to the edge frame of the trailer structure. These devices characteristically are in fixed position and do not accommodate a snowmobile being at various locations along the length of the bed. In some cases portions of the frame are adapted to receive part of skis and retain them. These arrangements are lacking in versatility, and in some cases do no adequately restrain the vehicles.

Certain types of trailers utilized for transporting motorcycles and the like have a longitudinal channel in which the wheels are placed to prevent the wheels from sliding sideways, and the tie-down is accomplished by various devices as mentioned above. While assisting the positioning of the motorcycle, these channels substantially impair the use of the trailer for any other function, and do nothing to prevent the forward and backward motion of the motorcycle.

Many of the transport beds are constructed of a supporting frame to which a deck or bed is affixed. Various structures and devices have been utilized to affix the bed to the frame, including bolts, clamps, screws and sundry fixtures and fasteners. The prior art type of fastening is costly in assembly and does not readily allow replacement of worn or damaged bed material An improvement has been recognized in the prior art wherein side structural members have channels in which the bed material can be inserted and supported along its length. These prior art arrangements generally only deal with the entire bed and require substantial additional fastening structures across the width of the bed to the various frame support members. Such structures are not readily repairable or replaceable even with the sliding channels at the sides.

OBJECTS

It is a primary objective of this invention to provide an improved transport bed structure.

Yet another objective is to provide a transport bed that has improved clamp down and tie-down mechanisms.

Still a further object of the invention is to provide a rotatable telescoping clamp-down mechanism.

Another objective of the invention is to provide an improved clamp down mechanism operable in conjunction with a retention channel for variable placement.

Still a further object is to provide an improved tie-down mechanism operable with a retention channel.

A further object of the invention is to provide an improved bed mounting structure.

Still a further object of the invention is to provide bed mounting structures that minimize the cost of construction and maximize the ease of repair and replacement.

Another object of the invention is to provide improved clamp-down and tie-down mechanisms that are light-weight, durable, and relatively maintenance free.

These and other more detailed and specific objectives will become apparent from a consideration of the following description of the invention

SUMMARY OF THE INVENTION

The present invention includes a bed structure utilized for transporting objects, and includes an improved clamp down mechanism. One aspect of the improved clamp-down mechanism involves a telescoping clamping member that is associated with an elongated retention channel integrated as part of the bed structure, where the telescoping clamp mechanism can be selectively positioned along the length of the retention channel and utilized to clamp at various locations on the bed. One or more retention channels may be utilized in a spaced apart relationship. The telescoping clamp members can be retracted and rotated for installation into the clamp position and for releasing from the clamp position.

A tie-down mechanism can also be used within the same retention channels and is likewise subject to variable positioning along the retention channel to form a tie-down relationship with an object.

The telescoping clamp down mechanism and the tie-down mechanism are each retained in the retention channel by a rotatable cam that hold the mechanisms in the retention channel in a first position and allows them to be removed from the retention channel in a second position.

The retention channels and the structural frame members are adapted to have bed retaining channels along their lengths to support, retain, and protect the edges of the bed material without additional clamps or fastening mechanisms.

The rear frame member generally has a channel cross-section and is adapted for mounting lights within the channel recess to protect them from damage. In one configuration the rear member has a lower limit or lip portion for protecting the rear frame member if the associated bed structure is lowered to contact the surface for loading. The upper portion of the rear frame member includes a predetermined number of protrusions extending along the length thereof. A slidably engagable ramp structure is adapted with a longitudinal channel configured to match the arrangement of longitudinal protrusions on the rear frame member. The ramp member is slidably attached to the rear frame member when the bed structure has been put in place, and is adapted to retain and protect the rear edge of the bed. The ramp structure is sloped to allow ease of loading from the rear when the bed structure is utilized with a tiltable supporting structure.

All of the component parts are integrally formed from extruded light-weight material and cut to lengths required for assembly, there providing an efficient and cost-effective manufacturing system for various sizes of bed structures.

BRIEF DESCRIPTION OF THE DRAWINGS

FIG. 10 is a cross-sectional view that shows the shape of the rear frame member;

FIG. 11 is a cross-sectional view that shows the shape of the rear ramp and bed retention member; and FIG. 12 is a cross-sectional view showing the rear frame member with the rear ramp and bed retention member slidably engaged in cooperation with a portion of the bed.

DESCRIPTION OF THE PREFERRED EMBODIMENT

Figure 1:
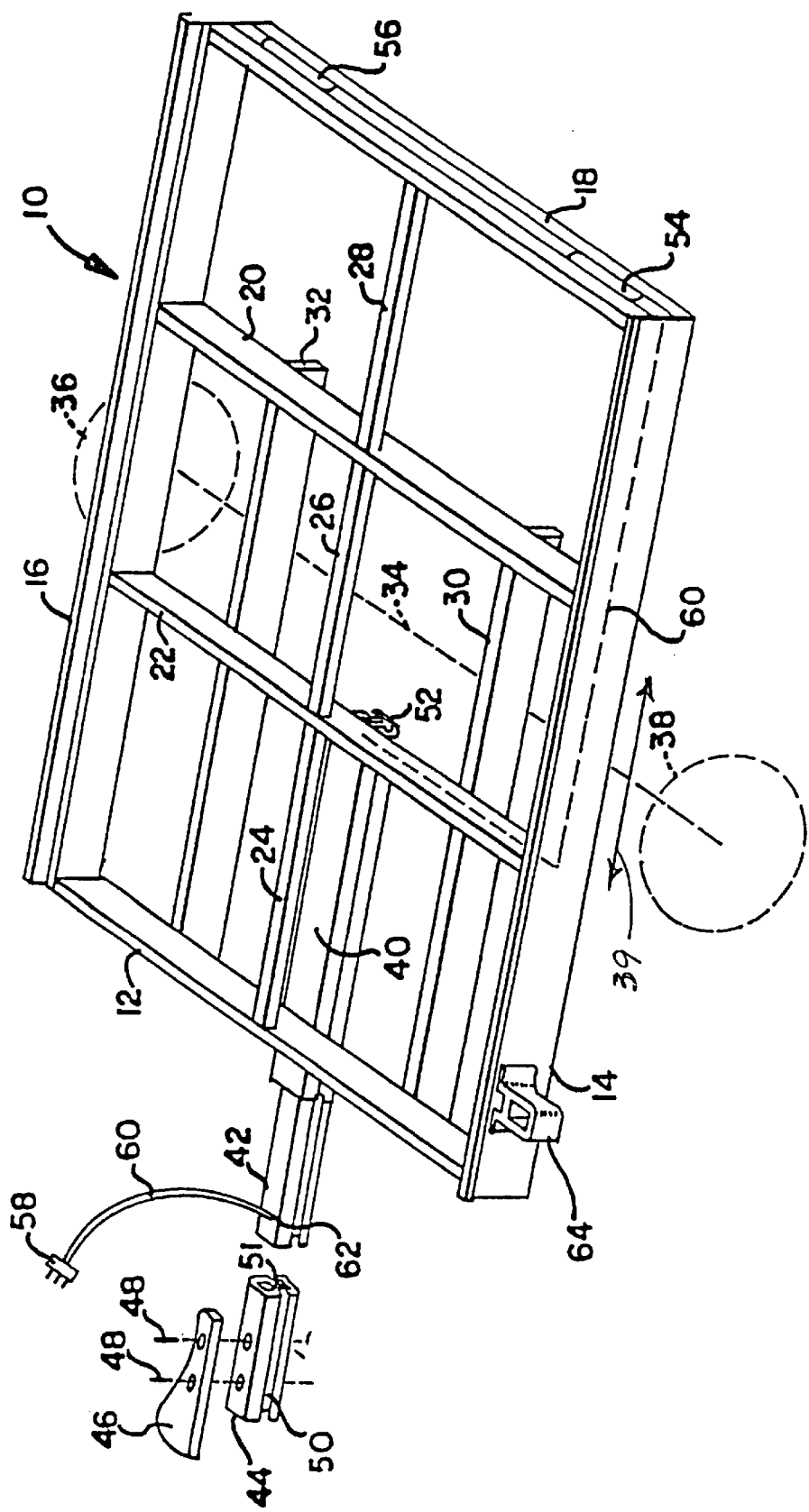
FIG. 1 is a perspective view of a trailer frame that can be utilized to support the improved bed structure.

FIG. 1 is a perspective view of a trailer frame and associated tongue having a pair of channels disposed at opposite sides and running longitudinally. The trailer frame 10 is made up of front beam 12, side panels 14 and 16, and rear channel member 18, each of which has a deck support portion. A pair of cross beams 20 and 22 are spaced front-to-back by spacers 24, 26 and 28. A pair of frame support members 30 and 32 are positioned parallel to one another and are arranged longitudinally to side support panels 14 and 16. These support members 30 and 32 are arranged for providing support to the entire frame 10 on an axle, represented by dashed line 34, and on a pair associated wheels shown as dashed lines 36 and 38. As will be described in more detail below, support members 30 and 32 cooperate with slidable mounting structures (not shown in FIG. 1) to allow slidable adjustment of the axle 34 either forwardly or rearwardly of the frame, as illustrated by arrow 39. This configuration of the trailer frame 10 is illustrative only, and various other configurations of members can be utilized as necessary to serve various uses, size considerations, and strength requirements.

A generally channel shaped member 40 is arranged to cooperate with a portion of tongue 42 and is located and affixed to the undersides of front beam 12 and cross beam 22, and is utilized for providing a vertical span support, as well as a lateral support for tongue 42.

The front end 44 of tongue 42 is adapted to have a hitch 46 attached as by bolts (not shown) extended through holes aligned on dashed lines 48. Tongue 42 has longitudinal opposed channels 50 and 51 extending along at least a portion of its length.

For fixed tongue trailer frames, channel 40 would be firmly affixed to tongue 42, as by bolts, welding, or other suitable interconnection. For those trailer frames that are characterized as tilt bed, end 52 of tongue 42 is pivotally mounted (not shown) to the tongue mount 40 near end 52. A releasable tongue catch (not shown in FIG. 1) is mounted forward of front beam 12 and operates to releasably couple tongue 42 within channel 40. When the tongue catch is released, trailer frame 10 is allowed to rotate about axle 34 in a clockwise direction until the bottom of rear channel 18 touches the surface, thereby allowing a snowmobile or other vehicle to drive onto or off of the trailer. Once weight is placed forward on the trailer, the frame rotates back until channel 40 reengages tongue 42 and the tongue clamp is utilized to hole the tongue in place. The tongue clamp will be described below. While channel 40 is shown to have a planar top until a pair of downwardly extending side members, it should be understood that various other configurations could be utilized with tongues of differing cross-sections, or to achieve some other structural goal Rear channel 18 has a pair of tail lights 54 and 56 mounted within the channel, so that the lights are protected from breakage or damage during loading. Electric power is provided from the tow vehicle through plug 58 and cable 60. Cable 60 extends through hole 62 in the top of tongue 42 and runs inside tongue 42 toward end 52. The cable 60 then is run inside beams 22 and 14 to the rear where electrical connection is made to lights 54 and 56. Running cable 60 inside the tongue and the beams protects it from damage and breakage. An alternative connection for cable 60 can be provided. The cable can be extended out through end 52 and attached externally to the underside of spacers 26 and 28, and extended to the back of end channel 18. Either interconnection will function. Various other electrical wiring configurations can be utilized.

A desired number of stake holders such as stake holder 64, can be mounted at desired points along side panels 14 and 16.

The tongue 42, end channel member 18, tongue channel 40, side panels 16, stake holder 64, and the beams are all fabricated from aluminum. The beams and spacers are all adapted to support a trailer deck (not shown) that characteristically will be constructed of plywood or some other suitable material. The aluminum members are fabricated by heating and formed by extruding to the desired shapes, and are joined together by welding or by corrosion resistant fastener devices as needed. The extrusion process provides members that are strong and are not stressed by bending and forming processes. The extruded structures are cut to length for the size trailer framer desired, thereby providing an efficient and cost-effective manufacturing process.

Figure 2:
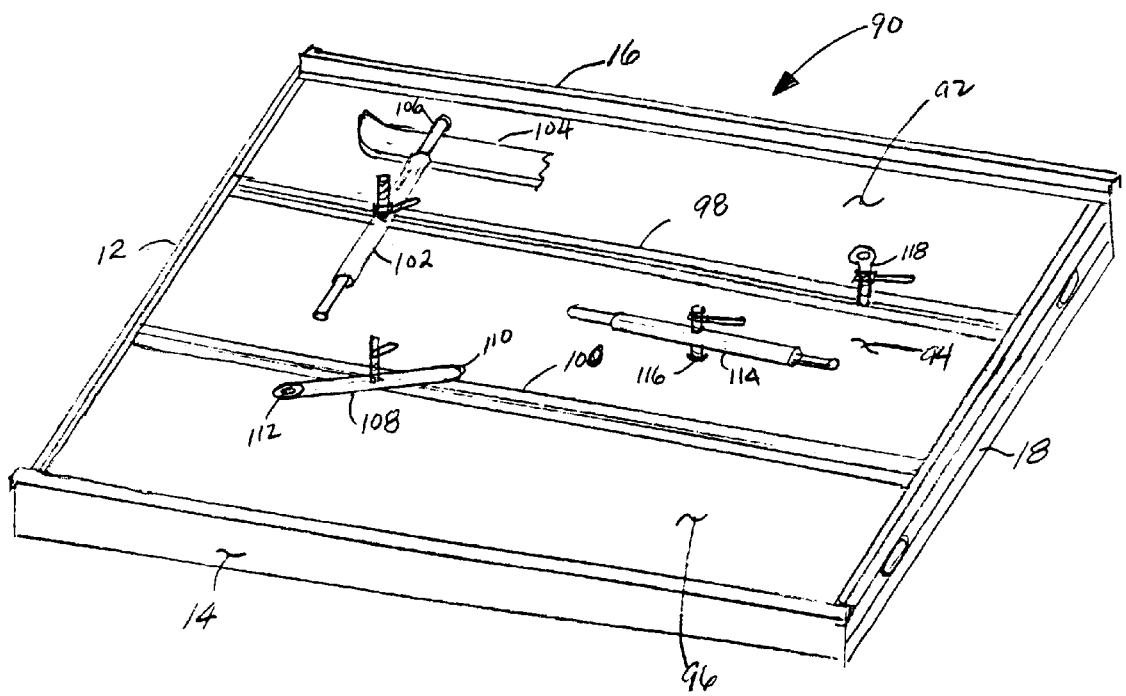
FIG. 2 is a perspective view of the improved bed structure.

FIG. 2 is a perspective view of the improved bed structure. In this configuration the bed structure 90 is comprised of three sections 92, 94, and 96, with bed sections 92 and 94 separated by retention channel 98, and bed sections 94 and 96 separated by retention channel 100. In this configuration bed section 92 is slidably supported by bed retention channels in side member 16 and by retention channel 98, and at the front by a portion of front beam 12 and at the rear by a portion of rear frame member 18. Bed section 94 is slidably retained by retention channels 98 and 100 along its length and at the ends by front beam 12 and rear frame member 18. Bed section 96 is slidably supported between side panel 14 and retention channel 100, and at the ends by front beam 12 and at the rear by rear frame member 18. A telescoping clamp-down mechanism 102 is shown in the clamping position with a partial ski 104 clamped beneath extended end portion 106 and the surface of bed section 92. Telescoping clamp-down mechanism 108 is shown with its ends 110 and 112 telescoped inwardly and rotated in a manner to allow any vehicle or snowmobile to straddle it while being loaded without interference.

Retention channels 98 and 100 are substantially parallelly disposed and extend longitudinally on bed 90 in this configuration. It is of course understood that the retention channels may be greater or lesser in number than two, may not necessarily extend over the entire length of the bed 90, or may also be situated in other configurations, such as horizontally, depending upon the intended usage of the overall transport structure.

For illustrative purposes another clamp down mechanism 114 is shown mounted at a fixed location 116 in the bed portion 94. It is of course understood that in this arrangement the clamp down mechanism 114 is not adjustable as to location, but is rotatable so that it can be positioned in any position around mounting position 116 and clamped in place.

Tie down mechanism 118 is shown slidably mounted in retention channel 98. It too can be positioned longitudinally along retention channel 98 and provide tie-down capability in addition to the clamp-down action of clamp-down mechanism 102. It is of course understood that tie-down mechanism 118 can also be fixedly mounted at any position desired on bed 90 and will operate as a fixed tie-down facility.

Figure 3:
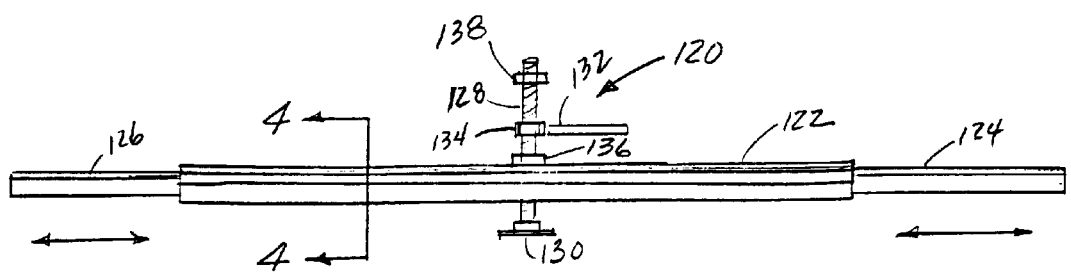
FIG. 3 is a side view of a telescoping clamp-down mechanism.

FIG. 3 is a side view of a telescoping clamp-down mechanism. The entire clamp-down mechanism is referenced generally by arrow 120 and has main body portion 122 with a pair of slidably engaged end portions 124 and 126 at opposite ends thereof. Telescoping members 124 and 126 are slidably engaged and can be totally retracted within the main body portion 122. The clamp down mechanism includes an elongated bolt 128 that extends vertically through the main body portion 122 and has a cam mechanism 130 affixed to one end. A clamping handle 132 can be utilized to turn a clamping nut 134 either downwardly to contact washer 136 or upwardly as far as stop mechanism 138.

Figure 4:
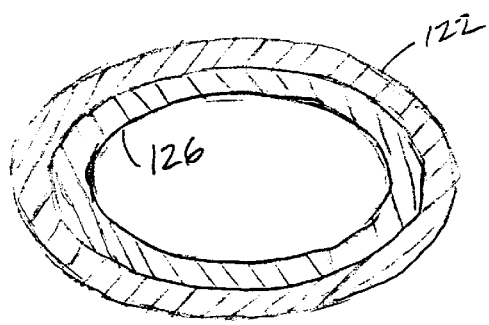
FIG. 4 is a cross-sectional view taken at line 4—4 in FIG. 3.

FIG. 4 is cross-sectional view taken at line 4—4 in FIG. 3. It can be seen that the shape of the main body portion 122 is oval in the preferred embodiment and has internal shape that substantially matches the slidably engaged end portion 126. Of course the same configuration exists with respect to end portion 124. It is understood that different cross-sectional shapes may be selected.

Figure 5:
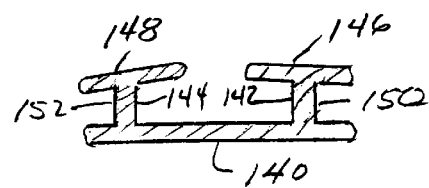
FIG. 5 is a cross-sectional view of the retention channel.

FIG. 5 is cross-sectional view of the retention channel.

In this configuration there is a base member 140, and a pair of spaced apart upwardly extending members 142 and 144 that have retention members 146 and 148 formed therewith respectively. The channel formed between retention members 146 and 148 is utilized to retain the cam structure 130. The longitudinal channels 150 and 152 are utilized to engage and retain respectively associated sides of sections of the bed. Note that upper members 146 and 148 are each slightly angled with respect to the base 140. This arranged such that when bed members are inserted into channels 150 and 152 there is a separating pressure between the base 140 and retention members 146 and 148.

Figure 6:
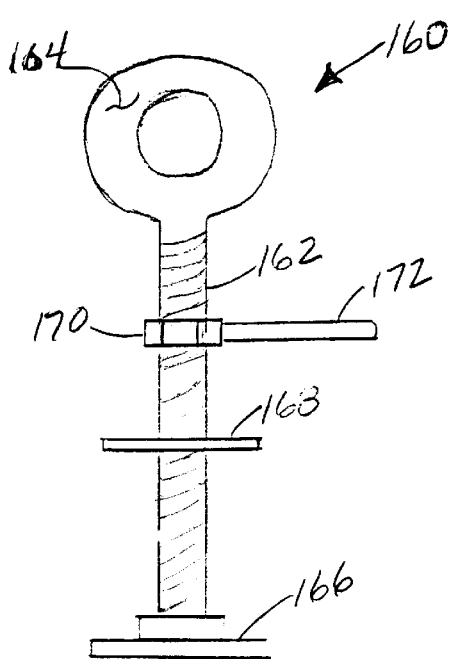
FIG. 6 is a side-view of a tie-down mechanism operable with the retention channels.

FIG. 6 is side-view of a tie-down mechanism operable with the retention channels. The tie-down mechanism 160 utilizes an elongated bolt 162 having a tie-down eye member 164 at one end thereof and cam mechanism 166 at the other end thereof. Intermediate is situated washer 168 and retention nut 170 that is operable by handle 172.

Figure 7:
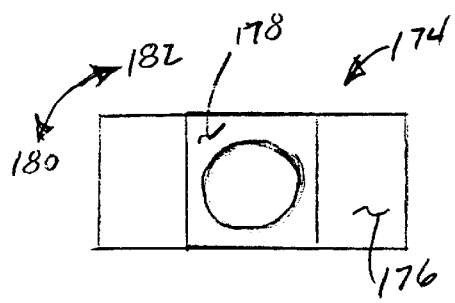
FIG. 7 is a plan view of the retention cam.

FIG. 7 is plan view of a retention cam. The cam structure 174 has a lower member 176 that has a length dimension that is similar to the width of separation of members 142 and 144 in the retention channel 146. It has an upper member 178 that is essentially square and has a dimension that approximates the distance between upper member 146 and 148 of the retention channel. These dimensions are such that when the cam 174 is rotated in the direction of arrow 180 it will be retained within an associated retention channel, and when rotated in the direction of arrow 182 will be positioned so that it is length wise of the retention channel opening and may be removed therefrom.

Figure 8:
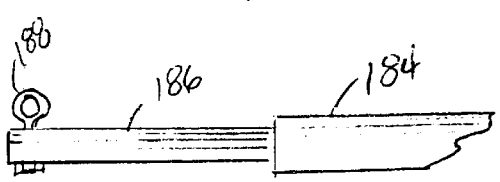
FIG. 8 is a partial view of a portion of the telescoping clamp-down mechanism having a tie-down portion.

FIG. 8 is partial view a of portion of a telescoping clamp-down mechanism having a tie-down portion. This illustrates an end 184 of a clamp-down mechanism with its associated slidably engaged end member 186 exposed. A tie-down ring 188 is mounted at the end of end member 186. This illustrates that the clamp down mechanism can also serve as a tie-down should that capability be required.

Figure 9:
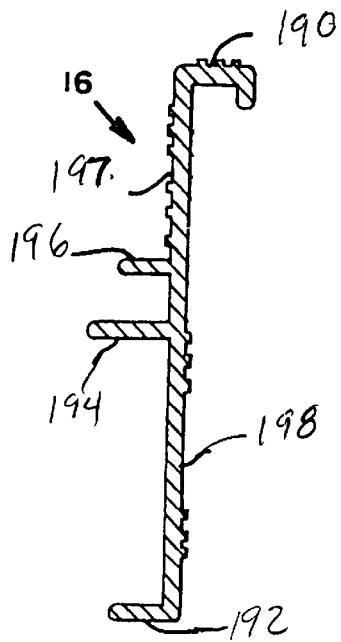
FIG. 9 is a cross-sectional view that illustrates the shape of the side panel of the frame structure.

FIG. 9 is a cross-sectional view that illustrates the shape of the side panel of the frame structure. This illustrates that side panel 16 has an outwardly extending upper member 190, and a lower inwardly extending member 192. A pair of longitudinal spaced apart bed retaining members 194 and 196 are adapted to allow the associated portion of the bed to be slidably extended therebetween and retained in place. The upper portion 197 provides an upper edge around the bed, and the lower portion 198 is utilized in fabrication with other structural members to provide the bed support.

FIG. 10 is cross-sectional view that shows the shape of the rear frame member. Here rear member 200 has a vertical portion 202 with its lower end formed into a rearwardly extending stop member 204. The upper member 206 has longitudinal protrusions 208 and 210 that form a predetermined configuration for use in slidably mounting and associated rear ramp and bed retention member. The channel that is formed between lower member 204 upper member 206 is utilized for mounting lights (not shown) and protecting them from damage. It is of course understood that additional or differently spaced or placed longitudinal protrusions can be utilized.

FIG. 11 is cross-sectional view that shows the shape of the rear ramp and bed retention member. The rear ramp and bed retention member 212 has an upper lip 214 and a vertical face structure 216 formed therewith that are utilized to clamp and protect the rear end of the bed. A configured longitudinal channel 218 has a configuration that mates with the protrusions 208 and 210 on the rear frame member 200, and is adapted to allow the rear ramp and bed retention member 212 to be slidably engaged with the rear frame member 200. A ramp portion 220 is utilized to provide improved ms of loading ground driven vehicles when used with a tilt-bed trailer structure.

FIG. 12 is a cross-sectional view showing the rear frame member with the ramp and bed retention member slidably engaged in cooperation with a portion of the bed. It can be seen that rear frame member 200 supports a portion of the bed 222 on its upper surface of upper member 206. The rear ramp and bed retention member 212 is slidably engaged such that protrusions 208 and 210 are firmly and slidably engaged with configured channel 218.

The rear ramp and bed retention member provides several functions in addition to the ease of loading mentioned above.

As shown, it can be readily removed by simply sliding it from its slidable engagement with rear frame member 200. This allows the portions of the bed exposed to be slidably removed to the rear for repair or replacement. The rear ramp and bed retention member also acts as a wear strip such that if it becomes damaged through extensive use it may be quite readily removed and replaced without disruption of any of the bed structure. Further, during initial construction it allows the portions of the bed to be slidably inserted and it can then be affixed to the rear frame member to lock the portions of the bed in place.

Having described the preferred embodiment of the invention in conjunction with the drawings, it can be seen at the various stated purposes and objectives have been achieved, and at various modifications and extensions will be apparent to those skilled in the art within the spirit and scope of the invention. Accordingly, what is intended to be protected by Letters Patent is set forth in the appended Claims.

What is claimed is:

1. An improved trailer comprising:

a frame structure including a number of frame members;

at least one wheel rotatably coupled to said frame structure;

at least a pair of spaced-apart deck members, each having a load-bearing surface, said at least a pair of spaced-apart deck members having opposed edges and supported on said frame structure;

a pair of spaced-apart elongated retention members cooperatively positioned relative to said opposed edges and forming an elongated channel having a channel width therebetween;

a load retention device having a first portion slidably mounted and retained in said elongated channel by said pair of spaced-apart elongated retention members, said load retention device including a selectively releasable structure and a load engaging member coupled to said first portion and said selectively releasable structure, said load engaging member arranged to cooperate with a load in a manner to hold the load on one or more of said pair of spaced-apart deck members when said selectively releasable structure holds said load engaging member in a first position and to release the load when said selectively releasable structure releases said load engaging member in a second position.

2. The trailer of claim 1, wherein said first portion comprises:

an elongated member having a first end coupled to said selectively releasable structure, a second end, and a width narrower than said channel width; and a channel lock coupled to said second end, said channel lock having a length greater than said channel width, and a width less than said channel width, wherein said channel lock is retained in said elongated channel by said pair of spaced-apart retention members when said channel lock is in a first position and said channel lock can pass through said elongated channel when said channel lock is in a second position.

3. An improved trailer as in claim 1 wherein said load engaging member includes an elongated member having an aperture therethrough, and positioned intermediate said first portion and said selectively releasable structure.

4. An improved trailer as in claim 1 wherein each of said pair of spaced-apart elongated retention members further include a deck retention member for engaging an associated one of said opposed edges of said pair of spaced-apart deck members.

5. An improved trailer as in claim 4, wherein each of said pair of spaced-apart elongated retention members further includes a deck support member for cooperating with an associated said deck retention member to slidably support and retain an associated one of said opposed edges.

6. An improved trailer as in claim 1 wherein said pair of spaced-apart elongated retention members are joined together by a deck support member, wherein said deck support member supports said opposed edges of said at least a pair of spaced-apart deck members.

7. An improved trailer as in claim 6 and further including a pair of deck retention members coupled to associated ones of said pair of spaced-apart elongated retention members, wherein a deck edge engaging channel is formed between said deck support member and each of said pair of deck retention members.

8. A trailer having a versatile tie-down structure comprising:

a tongue structure;

a plurality of frame members affixed in a predetermined frame structure, each of said frame members at least having a deck member support surface,, at least one support wheel mounted to said plurality of frame members;

a retention channel member having a longitudinal retention channel formed therein, said longitudinal retention channel having an elongated channel opening having a predetermined width, said retention channel member including first and second spaced-apart longitudinal deck support members and further including first and second spaced apart deck retention members;

a pair of deck members, each having a load-bearing surface, and first predetermined edges in slidable cooperation with an associated one of said first and second spaced-apart longitudinal deck support members and said deck retention members of said retention channel member and associated ones of said deck member support surfaces on said plurality of frame members; and a holding mechanism slidably mounted in said longitudinal retention channel to allow selective movement along said longitudinal retention channel, said holding mechanism including a selectively releasable structure retained within said retention channel member when in a first position within said retention channel member and releasable through said longitudinal retention channel when in a second position.

9. A trailer having a versatile tie-down structure as in claim 8 wherein said holding mechanism comprises:

a load securing member having an aperture therethrough, said load securing member to cooperate with a load in a manner to hold the load to said load-bearing surface of one or more of said pair of deck members;

an elongated member extending through said aperture and having a first end and a second end on opposite sides of said load securing member;

said selectively releasable structure including a cam structure coupled to said first end of said elongated member, said cam structure having a first dimension greater than said width of said elongated channel opening and arranged to slidably retain said cam structure within said longitudinal retention channel and said cam structure having a second dimension less than said width of said elongated channel opening to allow release of said cam structure from said retention channel member; and a clamping device on said second end; whereby said clamping device can exert or release holding pressure on said load securing member.

10. A trailer having a versatile tie-down structure as in claim 9, wherein said load securing member further includes:

a main member having first and second load-engaging ends, each adapted to selectively engage and hold load elements on said load bearing surface.

11. A trailer having a versatile tie-down structure as in claim 8, wherein said selectively releasable structure comprises:

a rotatable cam structure having a first dimension greater than said width of said elongated channel opening and arranged to slidably retain said cam structure within said longitudinal retention channel and said cam structure having a second dimension less than said width of said elongated channel opening to allow release of said cam structure from said retention channel member through said elongated channel opening when said second dimension of said cam structure is rotated into substantial alignment with said elongated channel opening; and;

a clamping device to selectively apply or release holding pressure on said retention channel member.

12. A trailer having a versatile tie-down structure as in claim 11, wherein said clamping device includes a tying device mounted thereon.

13. A trailer having a versatile tie-down structure as in claim 8 and further including:

at least an additional said retention channel member;

at least an additional said holding mechanism in slidable cooperation with said at least an additional said retention channel member; and at least an additional deck member having mounting edges, at least one of said mounting edges in cooperation with said at least an additional said retention channel member.

14. A trailer having a versatile tie-down structure as in claim 8, wherein said first and second spaced-apart deck retention members are positioned in a predetermined angled relationship in a cooperative relation to said first and second spaced-apart longitudinal deck support members, respectively, thereby forming a first channel to slidably engage an associated one of said predetermined edges of one of said pair of deck members, and forming a second channel to slidably engage an associated one of said predetermined edges of the other one of said pair of deck members.

15. A trailer having a versatile tie-down structure comprising:

a tongue structure;

a frame structure forming a bed-support, said frame structure including at least two longitudinal members and at least one transverse support member;

at least one rotatable wheel mounted to support said frame structure; first and second bed members supported on said frame structure, each having an upper load-support surface, said first bed member having a first edge and said second bed member having a second edge, said first edge and said second edge arranged in a predetermined spaced-apart position;

first and second elongated retention members, each mounted to respectively associated ones of said first edge and said second edge and forming an elongated channel having a predetermined width therebetween; and a load holding device selectively slidably retained by said first and second elongated retention members and slidably positionable along said elongated channel or releasable through said elongated channel, said load holding device adapted to hold a load item to one or both of said load-support surfaces.

16. A trailer having a versatile tie-down structure as in claim 15, wherein said load holding device includes:

an elongated clamping device having an aperture there through;

a tension adjusting device extending through said aperture and having a first end and a second end on opposite sides of said elongated clamping device;

a selectively releasable structure including a cam structure coupled to said first end of said tension adjusting device, said cam structure having a first dimension greater than said width of said elongated channel and arranged to slidably retain said cam structure within said elongated channel and said cam structure having a second dimension less than said width of said elongated channel to allow release of said cam structure from said first and second elongated retention members; and an adjustable clamping member on said second end;

whereby said clamping member can exert holding pressure on said elongated clamping device in a first position or can release holding pressure in a second position and allow rotation of said elongated clamping device.

17. A trailer having a versatile tie-down structure as in claim 16, wherein at least one transverse support member is arranged transversely to said elongated channel to provide load support to said first and second bed members.

* * * * *